United States Patent

[11] 3,609,482

| [72] | Inventors | Frank H. Edelman<br>Wellesley;<br>Simon Ernest Mayer, Lexington, both of Mass. |
| --- | --- | --- |
| [21] | Appl. No. | 6,439 |
| [22] | Filed | Jan. 28, 1970 |
| [45] | Patented | Sept. 28, 1971 |
| [73] | Assignee | Sylvania Electric Products Inc. |

[54] BISMUTH TITANATE FILM CAPACITOR AND METHOD OF MANUFACTURE
11 Claims, 3 Drawing Figs.

[52] U.S. Cl. .................................................. 317/258,
106/39 R, 117/217
[51] Int. Cl. ........................................................ H01g 3/135,
C04b 35/46
[50] Field of Search........................................... 317/258,
261; 106/39 R, DIG. 5; 117/124 T, 217; 252/63.2, 63.5

[56] References Cited
UNITED STATES PATENTS

| 3,179,525 | 4/1965 | Welsby et al. ................. | 106/39 R |
| 3,293,077 | 12/1966 | Kaiser et al. .................. | 117/217 |
| 3,352,697 | 11/1967 | Fujiwara et al. .............. | 106/39 R |
| 3,365,631 | 1/1968 | Delaney et al. ............... | 317/258 |
| 3,468,680 | 9/1969 | Fuijiwara...................... | 106/39 R |

OTHER REFERENCES

Baldwin, Ceramic Industry, " How To Use Electronic Ceramics Better," Aug. 1958, pages 88– 92. Copy in 106– 39 R.

*Primary Examiner*—Laramie E. Askin
*Attorneys*—Norman J. O'Malley, Elmer J. Nealon and David M. Keay ABSTRACT: Film capacitor of two conductive electrodes with an intervening dielectric layer of bismuth titanate and a glass binder. The capacitor is fabricated by depositing a base electrode of a gold-palladium alloy on an alumina substrate. A dielectric paste of a mixture of bismuth titanate, a lead-borosilicate glass, and a resin solution is silk screened onto the base electrode, and then baked and fired. An upper electrode of silver is deposited on the bismuth titanate.

PATENTED SEP 28 1971 3,609,482

INVENTORS
FRANK H. EDELMAN
SIMON ERNEST MAYER

BY David M. Keay

AGENT

BISMUTH TITANATE FILM CAPACITOR AND METHOD OF MANUFACTURE

BACKGROUND OF THE INVENTION

This invention relates to deposited capacitors, More particularly, it is concerned with dielectric films employed in deposited capacitors of the thick film type.

Capacitors which are compatible with well-known microelectronic hybrid circuit technology may be formed on suitable substrates by the successive deposition of a conductive material to form the base electrodes, a dielectric material, and a conductive material to form the upper electrodes. For certain applications, for example, in a telephone circuit using an RC frequency determining network, it is desirable to employ capacitors having relatively high permittivity and a low dissipation factor. These properties should be stable over a wide range of temperatures and for a long period of time.

SUMMARY OF THE INVENTION

A film capacitor in accordance with the invention having improved characteristics includes a pair of electrodes and a layer of dielectric material between the electrodes which is composed essentially of a mixture of bismuth titanate and a glass binder constituting between 1 and 25 percent by weight of the mixture. The capacitor may be fabricated by forming one of the electrodes of the capacitor of a conductive material. A layer of dielectric material composed of a mixture of bismuth titanate and a glass binder is formed on the one electrode. Then a layer of conductive material is deposited on the layer of dielectric dielectric material to serve as the other electrode of the capacitor.

BRIEF DESCRIPTION OF THE DRAWING

Additional object, features, and advantage of the invention will be apparent from the following detailed discussion together with the accompanying drawings wherein.

DETAILED DESCRIPTION OF THE INVENTION

Figure 1:
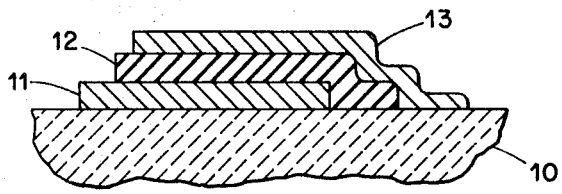
FIG. 1 is a view in cross section of a capacitor in accordance with the invention.
Figure 2:
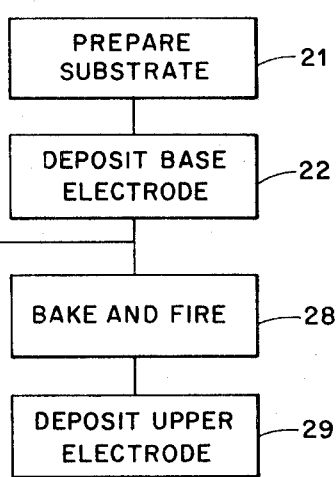
FIG. 2 is a flow chart diagramming the steps of the process of fabricating capacitors in accordance with the invention.

In the fabrication of a capacitor in accordance with the present invention as illustrated in in FIG. 1, reference also being made to the process flow chart of FIG. 2, a substrate 10 of an insulating material is first prepared; operation 21 in the flow chart of FIG. 2. A base electrode 11 of a suitable conductive material is deposited onto the surface of the substrate in a desired configuration; operation 22. The conductive material for the base electrode may be deposited by any of a variety of well-known techniques including vacuum deposition, thermal decomposition, sputtering, or silk screening. The base electrode material may be gold, platinum, and palladium, combined with nonmetallic materials for adhesion and for modification of the electrical properties of the electrode.

After the base electrode 11 has been deposited, a layer of dielectric material 12 is formed on the base electrode. The dielectric material is silk screened onto the base electrode in the form of a paste. The dielectric paste is produced by first preparing a mixture of bismuth trioxide and titanium dioxide powder in a ration of 1 mol to 2 mols; operation 23. The mixture is heated in an oxidizing atmosphere; operation 24; to produce bismuth titanate. The reacted materials are pulverized to reduce the particle size; operation 25; and then mixed with particles of a suitable glass, for example, a lead-boro-silicate or modified lead-boro-silicate glass consisting essentially of from 55 to 80 percent by weight of lead oxide, from 10 to 17 percent by weight of boric oxide, from 10 to 25 percent by weight of silicon oxide, from 0 to 5 percent by weight of aluminum oxide, and from 0 to 1 percent by weight of lithium oxide. The glass preferably constitutes from 2-½ to 10 percent of the mixture. A suitable resin solution is added to form a paste of appropriate viscosity for silk screening; operation 26.

The bismuth titanate paste is deposited on the base electrode 11 in the desired configuration by conventional silk screening techniques; operation 27. The assembly is placed in an oven and baked to drive off the solvent in the resin solution and cause the dielectric material to solidify and adhere to the base electrode. The assembly is then fired at a higher temperature to burn off the organic resin material which acts as a temporary binder, and to melt the glass which upon cooling serves as a binder holding the particles of bismuth titanate together and to the base electrode 11; operation 28.

An upper electrode 13 is then deposited on the dielectric layer of bismuth titanate 12; operation 29. The conductive material of the electrode may be deposited by any of the conventional deposition techniques. The conductive material for the upper electrode may be silver, an alloy of gold and palladium, or an alloy of gold and platinum. After the upper electrode 13 has been deposited, the capacitory may be covered with a suitable glaze to serve as protection for the device.

In accordance with the invention capacitors were produced having bismuth titanate dielectric layers of different thicknesses. The capacitors were fabricated on substrates on 96 percent alumina which were thoroughly cleaned in the conventional manner. The base electrode 11 for each device was formed by silk screening a paste containing gold, palladium, and a high temperature glass binder onto the surface of a substrate 10. The assembly was fired at a temperature of 985° C. for a period of 15 minutes to burn off the organic vehicle in the paste and cause the resulting alloy of gold and palladium to adhere to the substrate. The base electrode 11 was approximately 15 microns thick.

Bismuth titanate paste was produced by thoroughly mixing powders of pure bismuth trioxide and titanium dioxide. The mixture was constituted of 74.46 percent by weight of bismuth trioxide and 25.54 percent by weight of titanium dioxide, a mol ratio of 1 to 2. The mixture was reacted in a platinum crucible by heating in an oxidizing atmosphere. The temperature of the crucible was raised from room temperature to 1,050° C. over a period of 4 hours and then maintained at that temperature for 1 hour.

The reacted material was removed from the crucible, crushed so as to pass through a 60-mesh screen and then ball-milled for three days with alumina cylinders in an alcohol dispersing medium. After ball-milling the dispersion was centrifuged to remove excess alcohol. The remaining material was 83 percent solids and the size of the particles of bismuth titanate averaged less than 0.3 micron.

A screenable paste was made by mixing the bismuth titanate dispersion together with particles of a permanent binder of a lead-boro-silicate or modified lead-boro-silicate glass and a temporary binder of a resin solution. Various compositions of glass were employed including those in the following table:

| Constituent | Glass A | Glass B | Glass C | Glass D |
|---|---|---|---|---|
| lead oxide | 55.9 | 78.2 | 47 | 70.2 |
| boric oxide | 16.6 | 10.2 | 12 | 10.2 |
| silicon oxide | 22.9 | 11.6 | 9 | 19.6 |
| aluminum oxide | 4.1 | | 2 | |
| lithium oxide | 0.6 | | | |
| zinc oxide | | | 30 | |

(figures in % by weight)

In one specific example the composition of the glass was 70.2 percent by weight lead oxide, 10.2 percent by weight boric oxide, and 19.6 percent by weight silicon dioxide. The resin solution was 6 percent by weight ethyl cellulose in a high molecular weight alcohol, specifically tridecanol. The paste was constituted of 72.9 percent by weight of the bismuth titanate dispersion, 3.4 percent by weight of the glass, and 18.7 percent by weight of the resin solution.

The dielectric paste was silk screened onto the base electrode employing conventional techniques. The assembly was baked at a temperature of 125° C. for a period of approximately 10 minutes to drive off the solvent whereby the resin solidified and acted as a temporary binder for the dielectric material. The assembly was then subjected to a firing cycle during which the temperature was raised at a rate of about 40° C. per minute to a peak temperature of 1,010° C. and held at that temperature for a period of 10 minutes in order to burn off the organic materials, melt the glass, and sinter the dielectric. Upon cooling, the glass served as a permanent binder fusing the particles of bismuth titanate to each other and to the base electrode.

An upper electrode 13 was then formed by silk screening a paste containing silver and a glass binder onto the layer of bismuth titanate 12. The assembly was subjected to a firing cycle during which the temperature was raised at a rate of about 55° C. per minute to a peak temperature of 560° C., held at that temperature for a period of 3 minutes, and then cooled to room temperature at a rate of about 80° C. per minute. The upper electrode 13 was approximately 15 microns thick.

The capacitor was protected by applying a protective glass by conventional silk screening techniques. Specifically a devitrifiable lead-zinc-boro-silicate glass about 50 microns thick was found to be satisfactory.

The data in the following table is representative of the characteristics of capacitors fabricated in accordance with the foregoing description and having bismuth titanate dielectric layers from 24 to 26 microns thick.

| | |
|---|---|
| Permittivity (K) | 64–74 |
| Temperature Coefficient of Capacitance (TCC) in p.p.m./°C. from Room Temperature to 125° C. | −28 to +16 |
| Dissipation Factor in % | |
| Room Temperature | 0.03–0.09 |
| 125° C. | 0.93–1.06 |
| Capacitivity in pf./in.$^2$×1,000 | 14.6–18.3 |
| Aging Stability in %/decade | less than 0.1 |

Figure 3:
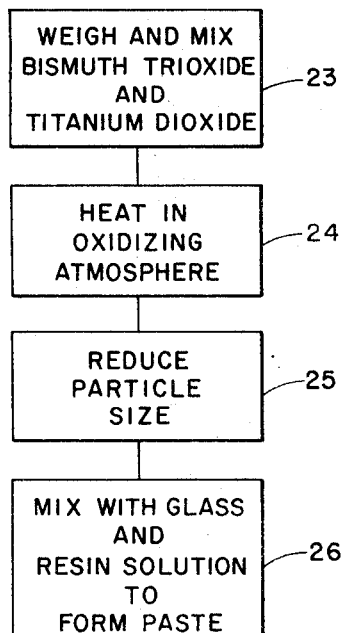
FIG. 3 is a graph illustrating certain characteristics of capacitors according to the invention.
Figure 3:
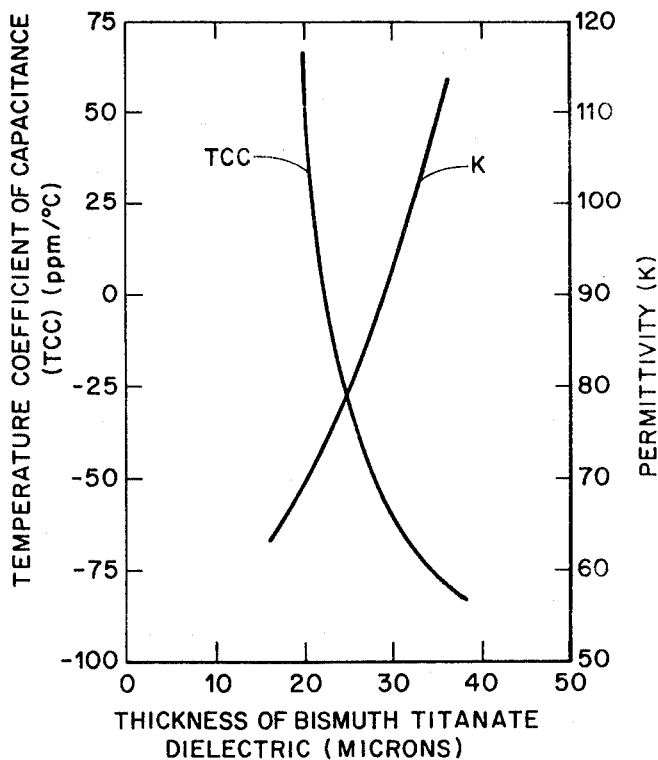

FIG. 3 illustrates graphically variations in permittivity (K) and temperature coefficient of capacitance (TCC) with thickness of the bismuth titanate dielectric layer. The graph is based on data obtained from measuring the characteristics of several capacitor according to the invention having dielectric layers of bismuth titanate between 20 and 35 microns thick. Curve K indicates that the permittivity of a capacitor increases with increases in thickness over the range shown. The curve TCC illustrates that the temperature coefficient of capacitance of a capacitor may have a negative valve or a positive valve depending on the thickness of the bismuth titanate layer. Thus, capacitors having a zero temperature coefficient, so-called NPO devices, may readily be produced.

While there has been shown and described what is considered a preferred embodiment of the present invention, it will be obvious to those skilled in the art that various changes and modifications may be made therein without departing from the invention as defined by the appended claims.

What is claimed is:

1. A capacitor comprising
a pair of electrodes; and
a layer of dielectric material between the electrodes composed essentially of a mixture of bismuth titanate and a glass binder constituting between 1 and 25 percent by weight of the mixture.

2. A capacitory in accordance with claim 1 wherein the glass binder constitutes between 2½ and 10 percent by weight of the mixture.

3. A capacitor in accordance with claim 2 wherein
one of the electrodes of said pair comprises material selected from the group consisting of gold, platinum, alloys of gold and palladium, and alloys of gold, platinum, and palladium; and
the other electrode of said pair comprises material selected from the group consisting of silver, alloys of gold and palladium, and alloys of gold and platinum.

4. A capacitor in accordance with claim 3 wherein the glass binder consists essentially of
from 55 to 80 percent by weight of lead oxide;
from 10 to 17 percent by weight of boric oxide;
from 10 to 25 percent by weight of silicon dioxide;
from 0 to 5 percent by weight of aluminum oxide; and
from 0 to 1 percent by weight of lithium oxide.

5. A capacitor in accordance with claim 4 wherein
said one of the electrodes is composed of an alloy of gold and palladium and a glass binder; and
said other of the electrodes is composed of silver and a glass binder.

6. A capacitor in accordance with claim 4 including a substrate of insulating material; and wherein
said one of electrodes of said pair is adherent to the substrate, said one of the electrodes being composed of an alloy of gold and palladium and a glass binder and being approximately 15 microns thick;
said layer of dielectric material is between 20 and 35 microns thick; and
said other of the electrodes of said pair is composed of silver and a glass binder and is approximately 15 microns thick.

7. The method of producing a capacitor including the steps of
forming one electrode of the capacitor of a conductive material;
mixing together substantially pure bismuth trioxide and titanium dioxide in a ratio of 1 mol of bismuth trioxide to 2 mols of titanium dioxide; heating the mixture in an oxidizing atmosphere to react the heating and produce bismuth titanate;
pulverizing the bismuth titanate so produced;
mixing together the particles of bismuth titanate, the particles of a glass selected from the group consisting of lead-boro-silicate and modified lead-boro-silicate glasses, and a resin solution to form a paste for placing on the one electrode;
screening the mixture in paste form onto the one electrode;
heating the assembly to convert the mixture to a solid dielectric material; and
depositing a layer of a conductive material on the dielectric material to serve as the other electrode of the capacitor.

8. The method of producing a capacitory in accordance with claim 7 wherein
the one electrode comprises a material selected from the group consisting of gold, platinum, alloys of gold and platinum, and alloys of gold, platinum, and palladium; and
the layer of conductive material comprises a material selected from the group consisting of silver, alloys of gold and palladium, and alloys of gold and platinum.

9. The method of producing a capacitor in accordance with claim 7 wherein the glass constitutes between 2-½ and 10 percent by weight of the mixture and consists essentially of
from 55 to 80 percent by weight of lead oxide;
from 10 to 17 percent by weight of boric oxide;
from 10 to 25 percent by weight of silicon oxide;
from 0 to 5 percent by weight of aluminum oxide; and
from 0 to 1 percent by weight of lithium oxide.

10. The method of producing a capacitor in accordance with claim 11 wherein
the mixture of bismuth trioxide and titanium dioxide is heated in an oxidizing atmosphere by raising the temperature of the mixture from room temperature to 1,050° C. over a period of 4 hours and is maintained at that temperature for a period of 1 hour;

the bismuth titanate is pulverized to an average particle size of about 0.3 micron; and after screening mixture in past form the assembly is heated at a temperature of 125° C. for approximately 10 minutes, heated to raise its temperature at a rate of about 40° C. per minute to a temperature of about 1,010° C, and maintained at a temperature of about 1,010° for approximately 10 minutes.

11. The method of producing a capacitor in accordance with claim 10 wherein the step of forming one electrode of the capacitory includes screening a paste containing gold, palladium, a glass binder, and an organic vehicle onto a surface of the substrate; and heating the assembly to burn off the organic vehicle and cause the gold, palladium, and the glass binder to adhere to the surface of the substrate; and wherein the step of depositing a layer of conductive material on the layer of dielectric material includes screening a paste containing silver, a glass binder, and an organic vehicle onto the layer of dielectric material; and heating the assembly to burn off the organic vehicle and cause the silver to adhere to the layer of dielectric material.